United States Patent [19]

Jaskolski et al.

[11] 4,184,126

[45] Jan. 15, 1980

[54] TEMPERATURE SENSITIVE ASTABLE MULTIVIBRATOR

[75] Inventors: Stanley V. Jaskolski, Sussex; Robert W. Lade, Waukesha; Herman P. Schutten, Elm Grove; Gordon B. Spellman, Mequon, all of Wis.

[73] Assignee: Eaton Corporation, Cleveland, Ohio

[21] Appl. No.: 946,181

[22] Filed: Sep. 27, 1978

[51] Int. Cl.² .................. G01K 7/00; H03K 3/282
[52] U.S. Cl. ....................... 331/66; 73/362 SC; 307/310; 331/113 R; 340/598
[58] Field of Search ............ 331/66, 113 R; 73/342, 73/362 SC; 340/595, 598; 307/310

[56] References Cited

U.S. PATENT DOCUMENTS

| 3,308,667 | 3/1967 | Pearlman ..................... 331/66 X |
| 3,639,777 | 2/1972 | Bolinger ..................... 331/113 R X |
| 3,971,056 | 7/1976 | Jaskolski et al. ..................... 357/28 |

Primary Examiner—Siegfried H. Grimm
Attorney, Agent, or Firm—H. R. Rather; W. A. Autio

[57] ABSTRACT

A temperature sensitive thyristor is incorporated with an astable multivibrator to provide active temperature sensing. Below the switching temperature Tsw of the thyristor, an oscillatory signal is present at the output of the multivibrator. When the temperature exceeds Tsw, oscillation ceases because of the shunt path provided through the thyristor when it intrinsically switches to its low resistance on state above Tsw. Cooling results in resumption of oscillation. This is a "fail-safe" arrangement because component failure also provides a warning condition (absence of oscillation).

3 Claims, 1 Drawing Figure

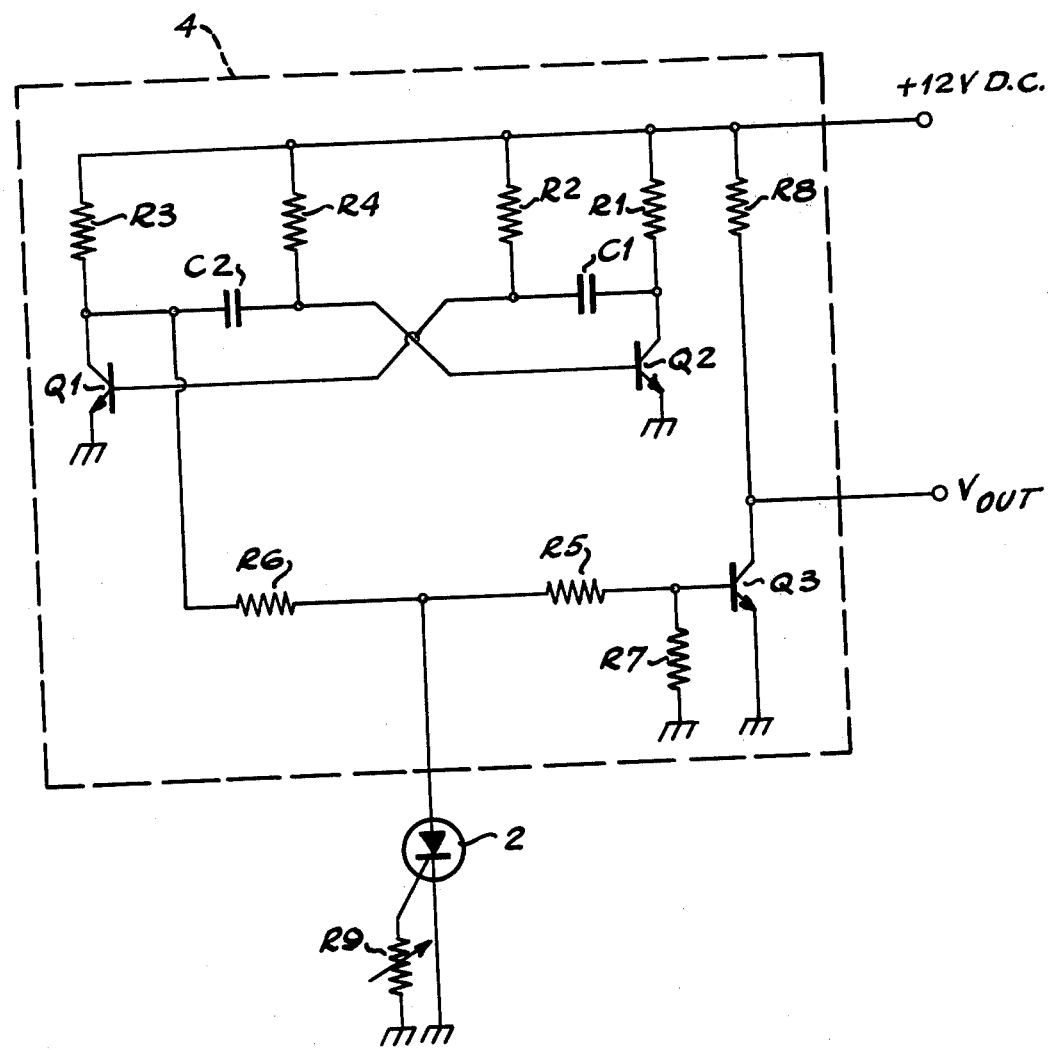

TEMPERATURE SENSITIVE ASTABLE MULTIVIBRATOR

BACKGROUND OF THE INVENTION

Multivibrators are known in the art. The present invention relates to an improvement thereupon for use in the area of active temperature sensing.

SUMMARY OF THE INVENTION

An object of the present invention is to provide an active temperature sensor comprising an astable multivibrator in combination with a thermally sensitive thyristor.

Another object is to provide an active temperature sensor which can easily be monolithically integrated.

Another object is to provide an active temperature sensor which "fails safe" so that component failure also provides a warning condition.

Another object is to provide an active temperature sensor which is especially adaptable for use in applications having DC power supplies, for example the automotive field.

Other objects and advantages will hereinafter appear.

BRIEF DESCRIPTION OF THE DRAWING

The sole drawing herein is a circuit diagram showing the combination of a temperature sensitive thyristor 2 and an astable multivibrator 4 in accordance with the invention.

DESCRIPTION OF THE PREFERRED EMBODIMENT

There is shown in the drawing an astable multivibrator circuit 4, indicated by dashed line. A square wave output signal is present at Vout due to the alternate conduction of transistors Q1 and Q2 in response to DC input.

Circuit 4 is known in the art and thus will be only briefly described. A DC source, for example 12 volts if used in automotive applications, is connected to the base of NPN transistor Q1 through 1.3 kilo-ohm resistor R1 and 0.01 microfarad capacitor C1 which are in parallel with 12 kilo-ohm resistor R2. Likewise the DC source is connected to the base of NPN transistor Q2 through 1.3 kilo-ohm resistor R3 and 0.01 microfarad capacitor C2 which are in parallel with 12 kilo-ohm resistor R4. The emitter of Q1 is grounded and the collector is connected to the junction of R3 and C2. The emitter of Q2 is grounded and the collector is connected to the junction of R1 and C1. A transistor Q3 has its base connected through 1.5 kilo-ohm resistors R5 and R6 to the junction of C2 and the collector of Q1. Another 1.5 kilo-ohm resistor R7 is connected between ground and the base of Q3. The emitter of Q3 is grounded and the collector is connected through 1.5 kilo-ohm resistor R8 to the DC supply. Vout is derived from the junction of R8 and collector of Q3.

When Q1 conducts, Q3 is off because of the drop in base drive voltage applied thereto, and Vout is high. When Q1 is off (Q2 on), Q3 conducts because the base drive voltage applied thereto increases, and thus Vout is low.

A temperature sensitive thyristor 2 is connected between ground and the junction of R6 and R5. This thyristor may be like that disclosed in U.S. Pat. No. 3,971,056, issued July 20, 1976, to Jaskolski et al or disclosed in U.S. Pat. No. 4,112,458, issued Sept. 5, 1978 to Jaskolski et al, which describe a thyristor thermally actuatable to intrinsically switch between high and low resistance states in response to a predetermined switching temperature Tsw. When the temperature is below Tsw, thyristor 2 is in its high resistance off state and has no affect on the oscillation of Vout between high and low. When the temperature exceeds Tsw, thyristor 2 switches to its low resistance on state and shunts base drive current therethrough away from Q3, whereby Q3 remains off regardless of the non-conduction of Q1, and hence Vout remains high. Cooling to a temperature below Tsw results in resumption of oscillation at Vout. A variable resistor R9 may be connected between ground and a gate of thyristor 2 for varying Tsw, as taught in said patents.

An active temperature sensor is thus provided which has numerous applications. For example, because of its amenability to use with a 12 volt DC power supply, the invention is well suited for automotive applications. The presence of oscillations at Vout indicates that the temperature of the engine or cooling system for example, is below a designated value. The absence of oscillations indicates overheating. This is a "fail-safe" arrangement since component failure also provides a warning condition, i.e. no oscillatory signal at Vout.

Since all components are in the usual value range of monolithic parts, the circuit in the drawing can easily be integrated on a single substrate with the possible exception of the capacitors. If high frequencies can be tolerated, the capacitors can also be integrated.

What is claimed is:

1. A temperature sensitive semiconductor device comprising in combination:
    an astable multivibrator having an oscillatory output signal; and
    a temperature sensitive thyristor thermally actuatable to intrinsically switch between high and low resistance states in response to a predetermined switching temperature Tsw and electrically connected to said multivibrator such that oscillation of said output signal ceases when the temperature of said thyristor exceeds Tsw.

2. The invention according to claim 1 wherein said multivibrator comprises a pair of alternately conductive transistors and a third transistor which is base driven in response to conduction to one of said pair of transistors, said thyristor being connected to the base of said third transistor.

3. The invention according to claim 2 wherein said base of said third transistor is connected to one of the emitter and collector of the other of said pair of transistors, said oscillatory output signal being the voltage appearing at one of the emitter and collector of said third transistor, non-conduction of said other of said pair of transistors causing a high voltage level to appear at its said one of the emitter and collector whereby a high base drive signal is applied to said base of said third transistor to render said third transistor conductive whereby said output signal is low, conduction of said other of said pair of transistors causing a low volage level to appear at its said one of the emitter and collector whereby a low base drive signal is applied to said base of said third transistor to render said third transistor non-conductive whereby said output signal is high, said thyristor being connected to said one of the emitter and collector of said other of said pair of transistors in parallel with said base of said third transistor to shunt said base drive signal when the temperature of said thyristor exceeds Tsw whereby said output signal remains high.

* * * * *